(12) United States Patent
Barry et al.

(10) Patent No.: US 9,891,938 B2
(45) Date of Patent: Feb. 13, 2018

(54) MODIFYING AN INSTANCE CATALOG TO PERFORM OPERATIONS

(71) Applicant: VMware, Inc., Palo Alto (CA)

(72) Inventors: David W. Barry, San Francisco, CA (US); Joanne Ren, Palo Alto, CA (US); Mike Zucca, Palo Alto, CA (US); Keith Farkas, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 49 days.

(21) Appl. No.: 14/752,438

(22) Filed: Jun. 26, 2015

(65) Prior Publication Data

US 2016/0378516 A1    Dec. 29, 2016

(51) Int. Cl.
*G06F 9/455*    (2006.01)

(52) U.S. Cl.
CPC .................. *G06F 9/4555* (2013.01)

(58) Field of Classification Search
USPC ............................................................ 718/1
See application file for complete search history.

(56) References Cited

U.S. PATENT DOCUMENTS

| 5,913,226 | A * | 6/1999 | Sato ..................... G06F 12/0833 |
| | | | 711/141 |
| 8,341,590 | B1 * | 12/2012 | Poole ....................... G06F 8/71 |
| | | | 717/101 |
| 8,516,137 | B2 | 8/2013 | Calder et al. |
| 2003/0126136 | A1 * | 7/2003 | Omoigui ............. G06F 17/3089 |
| 2008/0177905 | A1 * | 7/2008 | Ohta ..................... G06F 13/126 |
| | | | 710/14 |
| 2009/0300151 | A1 * | 12/2009 | Friedman ............ G06F 11/3664 |
| | | | 709/222 |
| 2012/0131025 | A1 * | 5/2012 | Cheung ............. G06F 17/30159 |
| | | | 707/755 |
| 2013/0305005 | A1 | 11/2013 | Calder et al. |
| 2014/0019934 | A1 * | 1/2014 | Schlarb ..................... G06F 8/72 |
| | | | 717/104 |
| 2014/0237006 | A1 * | 8/2014 | Doig ................. G06F 17/30171 |
| | | | 707/823 |

(Continued)

FOREIGN PATENT DOCUMENTS

WO    2007089354    8/2007

OTHER PUBLICATIONS

Daniel Kuhn, "Distributed Version Control Systems," Jul. 2010, Master degree course Computer Science and Media, pp. 1-11, retrieved from http://www.sonicwaves.de/downloads/publications/Distributed-Version-Control-Systems.pdf on Oct. 5, 2016.*

*Primary Examiner* — Chat Do
*Assistant Examiner* — William C Wood
(74) *Attorney, Agent, or Firm* — Fish & Richardson P.C.

(57) ABSTRACT

The present disclosure is related to methods, systems, and machine-readable media for modifying an instance catalog to perform operation. A storage system can include a plurality of packfiles that store data. The storage system can include a plurality of streams that include a plurality of hashes that identify the plurality of packfiles. The storage system can include an instance catalog that includes an identification of the plurality of streams. The storage system can include an operation engine to perform a number of operations on the plurality of packfiles by modifying the instance catalog using the identification of the plurality of streams.

17 Claims, 4 Drawing Sheets

(56) References Cited

U.S. PATENT DOCUMENTS

| | | | |
|---|---|---|---|
| 2014/0258316 A1* | 9/2014 | O'Hagan | G06F 17/30557 |
| | | | 707/756 |
| 2014/0279973 A1* | 9/2014 | Kelley | G06F 8/71 |
| | | | 707/695 |
| 2015/0286420 A1* | 10/2015 | Crisman | G06F 3/0613 |
| | | | 711/112 |

* cited by examiner

MODIFYING AN INSTANCE CATALOG TO PERFORM OPERATIONS

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed. Backing-up the VCI can include storing a copy of the VCI in a storage system.

DETAILED DESCRIPTION

Figure 1:
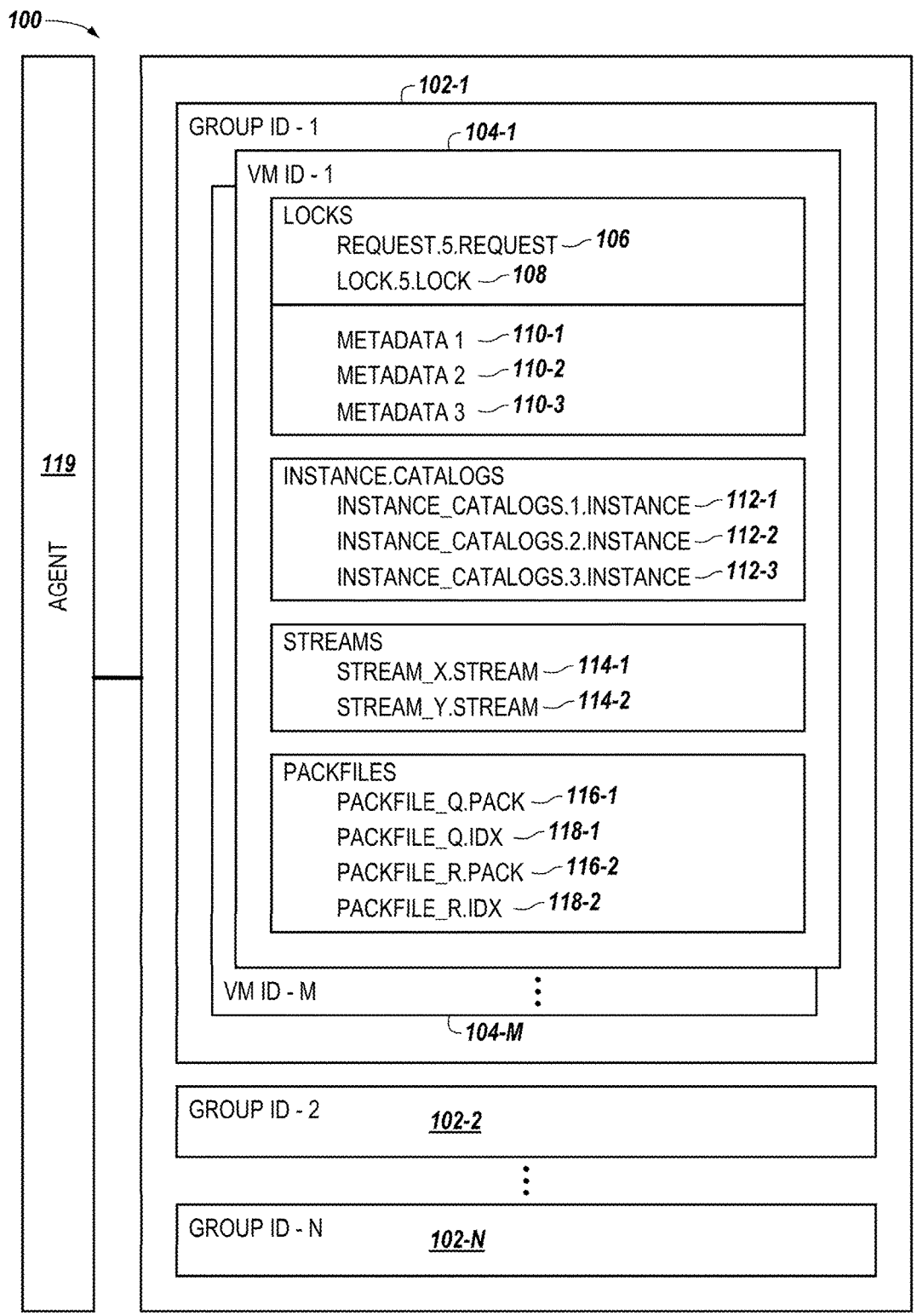
FIG. 1 is a block diagram of a system for storing data according to a number of embodiments of the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

As software defined data centers become increasingly popular and widespread, an increasing number of consumers deploy VCIs. The deployed VCIs can be created from data stored in an external data storage (e.g., a cloud storage device). An external data storage is referred to herein as a storage system. The storage system can include what is referred to as a "blob" store, or binary large object store. A storage system can include a collection of binary data stored as a single entity in a database management system (e.g., a cloud storage device). The storage system can store copies (e.g., backup copies) of the VCI as well as critical images, audio, and/or other multimedia objects.

Embodiments in accordance with the present disclosure can provide a storage system to store data. The storage system can store data in packfiles. As used herein, packfiles are objects that are used to store data. In a number of examples, the data stored in packfiles is associated with VCI. The data in the packfiles can be identified using hashes that are bundles in a stream. A stream is an object that is used to store metadata associated with the data stored in packfiles and hashes. The stream can be identified using an instance catalog. The storage system can perform a number of operations on the data stored in the packfiles by modifying the instance catalog using the identification of the stream.

FIG. 1 is a block diagram of a system for storing data according to a number of embodiments of the present disclosure. FIG. 1 includes storage system 100 and an agent 119. The storage system can include a plurality of groups 102-1, 102-2, . . . 102-N, referred to generally as groups 102. Each of the groups 102 includes a number of virtual identifications (VIDs) 104-1, . . . 104-M, referred to generally as VIDs 104. Each of the VIDs 104 includes a request file 106, and a lock file 108, a number of metadata files 110-1, 110-2, 110-3 (e.g., referred to generally as metadata files 110), a number of instance catalogs 112-1, 112-2, 112-3 (e.g., referred to generally as instance catalogs 112), a number of streams 114-1, 114-2 (e.g., referred to generally as streams 114), a number of packfiles 116-1 and 116-2 (e.g., referred to generally as packfiles 116), and a number of packfile indexes 118-1 and 118-2 (e.g., referred to generally as packfile indexes 118).

The storage system 100 can include local storage and/or cloud storage. The storage system 100 can include hardware, machine readable instructions (MRI) (e.g., software), and/or firmware to store data. The storage system 100 can store data using a database, a file system, and/or a different storage system. For example, the storage system 100 can be a binary large object (BLOB) storage system.

The agent 119 can include hardware, MRI, and/or firmware to replicate a VCI and/or store data in the storage system 100. Each of the groups 102 can be associated with an agent 119. For example, a first agent can own a group 102-1, a second agent can own a group 112-2, . . . , and an Nth agent can own a group 102-N. An agent can own a single group and/or a plurality of groups. As used herein, when an agent owns a group the agent can edit a number of files (e.g., documents) stored in the group and/or the VIDs 102. The group 102 can be used to identify associated data. For example, a group 102-1 can associate a number of different VCI that are associated with a single client. Each of the groups 102 can include metadata (e.g., not shown) that identifies the different VCIs stored in a respective group. For example, group 102-1 can include metadata that identifies that two different VCIs (e.g., a VCI associated with VID 104-1 and VCI associated with VID 104-M) are stored in the group 102-1.

Each of the VIDs 104 can include a request file 106, a lock file 108, metadata files 110, instance catalogs 112, streams 114, packfiles 116, and/or packfile indexes 118. The metadata files 110 can identify a VCI that is stored in the VID 104. In a number of examples, each of the VIDs 104 can store a number of different VCIs. For example, a VIDs 104-1 can store a first VCI that is associated with a first VM and a second VCI that is associated with a different second VM. In such an example, the metadata files 110 can identify which of the VCIs are stored in the VID 104. The metadata 110 in each of the VIDs 104 can include a time of creation of the respective VIDs 104, an agent provided ID for each of the VCIs stored in the respective VID, a storage system created ID for each of the VCIs stored in the respective VID, among other metadata associated with the VID 104.

The lock file 108 can be used to determine ownership of a particular VID, streams 114, packfiles 116, and/or packfile index 118. As used herein, referencing ownership of a packfile 116 can also include referencing ownership of a packfile index 118. Ownership of a VID, streams 114, and/or packfiles 116 can describe a number of privileges that allow an agent 119 to edit a VID, a stream 114, and/or packfiles 116. An edit operation can include a delete operation and/or a write operation among other types of edit operations. Use of the lock file 108 and/or the request file 106 are further described in FIG. 4.

The instance catalogs 112 contain a number of stream IDs provided by agent 119. The agent stream IDs can be associated with a stream ID provided by the storage system 100. The instance catalogs 112 can also contain agent metadata and/or caller metadata that can be used to perform a number of operations on the data stored in the packfiles 116. The agent metadata and/or the caller metadata can include metadata that describes a stream referenced by the stream ID. Performing a number of operations on the data stored in the packfiles 116 includes performing the number of operation indirectly on the packfiles 116 by performing the number of operations directly on the stream IDs, the agent metadata and/or the caller metadata.

Figure 2:
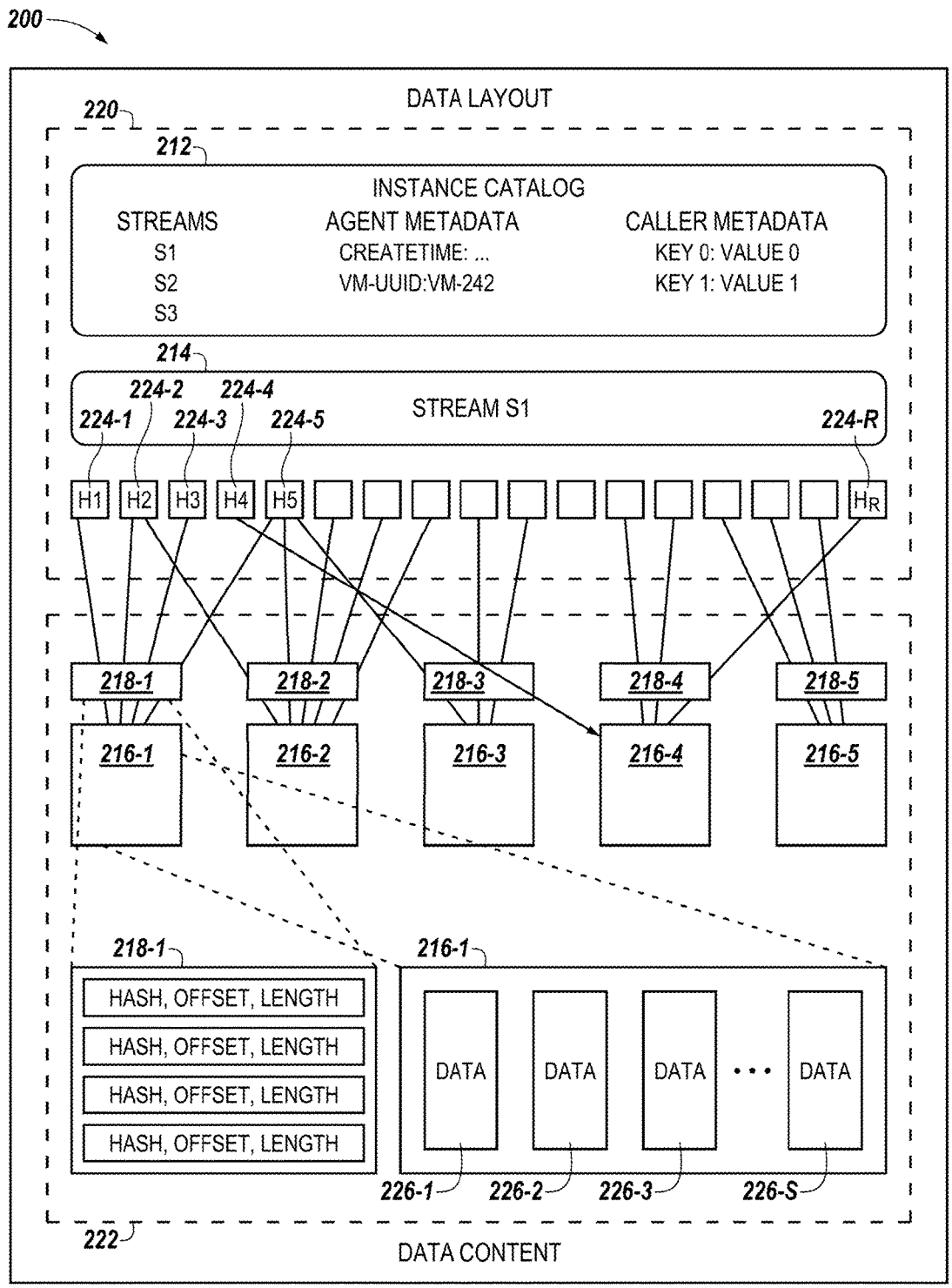
FIG. 2 is a block diagram of the separation of data layout from data in a storage system according to a number of embodiments of the present disclosure.

Performing a number of operations directly on the stream IDs can provide an advantage over previous storage systems by reducing the amount of time required to perform the number of operations. FIG. 2 provides an example of performing an operation directly on the instance catalog by modifying the instance catalog to perform an operation indirectly on the data stored in the packfiles 116.

In a number of examples, the instance catalogs can be associated with a version of a VCI that is stored as data in the packfiles 116. Each time that a new version of a VCI is stored as data in the packfiles 116, a new version of a stream can be created and/or a new catalog with a next version number can be created. For example, storing an initial VCI in the storage system 100 can include creating an instance catalog 112-1 with a first version. Storing a subsequent version of the VCI in the storage system 100 can include creating an instance catalog 112-2 with a second version. Storing a last version of the VCI in the storage system 100 can include creating an instance catalog 112-3 with a last version. Storing a version of the instance catalog each time a new version of a VCI is stored as data in the packfiles 116 can provide read access to each of the versions of the VCI. That is, the storage system 100 provides immutable object support which provides read access to a version of the VCI even after the VCI has been edited. As used herein, editing a version of the VCI can include creating a new version of the VCI that includes a number of changes that are referred to herein as edits and storing the new version of the VCI.

Each of the streams 114 includes a number of hashes that reference data stored in the packfiles 116. The hashes can be created using hash functions that map data of an arbitrary size to a hash of a fix size. The hashes can be used to identify different portion of data. The hashes can be used to distribute the data that comprises a VCI into a number of packfiles 116 and/or to construct a VCI that is stored in the number of packfiles 116. The streams 114 can further comprise a list of the packfiles 116 where the data that is referenced by the hashes is stored.

The packfiles 116 can include a storage location of the data that comprises the VCI. The packfiles 116 can be of a fixed size and/or of variable sizes. The sizes of the packfiles 116 can be predetermined and/or can be determined upon the distribution of data into the packfiles 116. In a number of examples, the packfiles 116 have no association with a file system. For example, the VCI that is stored in the packfiles 116 may have an associated file system that organizes the data that comprises the VCI. However, storing the data into the packfiles 116 may include disregarding a file system and may include storing the data into the packfiles 116 without a file system by storing the data that comprises the VCI as chunks of data into the file system.

Each of the packfiles 116 can have an associated packfile index 118. For example, packfile 116-1 can be associated with a packfile index 118-1 and packfile 116-2 can be associated with a packfile index 118-2. A packfile index can describe the data in a packfile. That is, a packfile index can provide an index to the data stored in the packfile. Instance catalogs 112, streams 114, packfiles 116, and packfile indexes 118 are further described in FIG. 2.

FIG. 2 is a block diagram that depicts the separation of data layout from data in a storage system 200 according to a number of embodiments of the present disclosure. FIG. 2 includes a storage system 200 that is analogous to storage system 100 in FIG. 1. Storage system 200 includes data layout 220 and data content 222. The data layout 220 includes at least one instance catalog 212, at least one stream 214, which are analogous to instance catalogs 112 and streams 114 in FIG. 1, respectively. The stream 214 includes a number of hashes 224-1, 224-2, 224-3, 224-4, 224-5 . . . , 224-R. The data content 222 includes a number of packfiles 216-1, 216-2, 216-3, 216-4, 216-5 and packfile indexes 218-1, 218-2, 218-3, 218-4, 218-5, which are analogous to packfiles 116, and packfile indexes 118 in FIG. 1, respectively.

In a number of examples, a VCI can be received by the storage system 220. The VCI can be partitioned into a number of chunks of data 226-1, 226-2, 226-3, 226-4 (e.g., not shown), 226-5 (e.g., referred to generally as data 226). A number of hashes 224-1, 224-2, 224-3, 224-4, . . . , 224-R (e.g., referred to generally as hashes 224) can be created to reference the data 226 using a hash function.

For example, a hash 224-1 can be created to reference a chunk of data 226-1. A hash 224-2 can be created to reference a chunk of data 226-2. A hash 224- 3 can be created to reference a chunk of data 226-3. A hash 224-4 can be created to reference a chunk of data 226-4 that can be stored in packfile 214-4 and is not shown. A hash 224-5 can be created to reference a chunk of data 226-5.

The data 226 can be organized into a stream 214. The stream can include the hashes 224. The order of the hashes 224 in the stream 214 can be used to determine an order of the data 226 that is stored in the packfiles 216 before the data is pushed (e.g., stored) into the storage system 200 and/or after the data is retrieved from the storage system. For example, a chunk of data 226-1 referenced by hash 224-1 can be organized to procede a chunk of data 226-2, 226-3, 226-4, 226-5 and a chunk of data 226-4 can be organized to procede a chunk of data 226-5 even though the chunks of data 226-1 and 226-5 are stored in packfile 216-1 and the chunk of data 226-4 is stored in packfile 216-4.

The distribution of the data to the packfiles 216 can be random and/or can follow a policy. For example, a policy for the distribution of the data to the packfiles 216 can dictate that the data is distributed to minimize the number of packfiles 216. The data 226 can be distributed according to a number of different policies.

A size of the packfiles 216 can be static and/or dynamic. A static size of the packfiles 216 describes that the size of the packfiles is defined before the data is received at the storage system 220. A dynamic size of the packfiles 216 describes that the size of the packfiles is defined after the data is received at the storage system 220.

In a number of examples, the size of the packfiles 216 can be a same size and/or different sizes. For example, a size of the packfiles 216 can be a same size or a portion of the sizes of the packfiles 216 can be a same size. The packfile 216-1 can be a different size than at least packfile 216-2.

Each of the packfiles 216 can be associated with a packfile index 218-1 that provides an index for the associated packfile. For example, packfile 216-1 can be paired with packfile index 218-1. Each of the packfiles indexes 218 can identify a hash, an offset, and/or a length associated with each of the data chunks 226 stored in the respective packfile. The hashes identified in the packfile indexes 218 can be the hashes 224-1 included in the stream 214. For example, a hash that points to data 226-1 and that is included in packfile index 218-1 can be a same hash as hash 224-1. Each offset in the packfile indexes 218 can describe an offset of the respective chunk of data from the beginning of a respective packfile. Each length in the packfile indexes 218 can describe a length of a respective chunk of data.

Separating the packfiles 216 from the packfile indexes 218 provides the ability to identify the chunks of data that are stored in a given packfile without having to look into each and every chunk of data. Furthermore, separating the packfiles 216 from the packfile indexes 218 provides the ability to retrieve a chunk of data without having to iterate through each of the chunks of data. For example, a hash, an offset, and/or a length associated with a chunk of data 226-5 in packfile index 218 can be used to identify that the chunk of data 226-5 is stored in packfile 216 and to identify a memory location at which the chunk of data 226-5 begins and ends.

As used herein, a computing engine can include hardware firmware, logic, and/or executable instructions, but includes at least hardware (e.g., a processor, transistor logic, application specific integrated circuit (ASIC), etc.) executing instructions to perform particular actions, tasks and functions described in more detail herein. For example, a push engine can be executed to store a VCI into packfiles 216. The push engine can segment (e.g., partition) a VCI into a number of chunks of data 226. The push engine can create a number of hashes 224 for each of the chunks of data 226. The push engine can store the hashes 224 in a stream 214. The push engine can store the chunks of data 226 in the packfiles 216 and the hashes 224, the offsets, and/or the lengths of the data chunks 226 in respective packfile indexes 218.

A query engine can be executed to retrieve a VCI from storage system 200. A storage system can receive an ID of stream 214. The ID of stream 214 can be received from agent 119 as illustrated in FIG. 1. The ID of stream 214 can be used to identify the stream 214. The stream 214 can be used to identify the packfiles 216 and/or packfile indexes 218 that are referenced by stream 214. The hashes 224 can be used to identify the packfiles 216 that store the data 226 referenced by the hashes 224. The data 226 can be retrieved from the packfiles 216 using the hashes 226 and/or the packfile indexes 218. The data 226 can be ordered using the order of the hashes 224 in the stream 214. The ordered data 226 can be provided to agent 119 as illustrated in FIG. 1.

In data layout 220, the instance catalog 212 can include an ID for each stream 214 in a given VID. For example, the instance catalog 212 can include 51 as the ID of stream 214. In a number of examples, the instance catalog 212 can include two IDs for each stream. For example, an instance catalog 212 can include a system ID for stream 214. The system ID can be created by the storage system 200. The instance catalog 212 can also include an agent ID for stream 214 the agent ID can be created by an agent 119 as illustrated in FIG. 1. The agent ID can be a human readable ID. The system ID can be an ID that allows the unique identification of each stream. Each system ID can be associated with an agent ID to identify a stream 214.

In a number of examples, an instance ID can also be created to describe a point in time that exists in more than one stream. The instance ID can be associated with more than one stream. For example, a particular instance ID can be associated with S1, S2, and/or S3. The instance ID can be stored in the instance catalog 212 as caller metadata.

The instance catalog can include agent metadata and caller metadata that can be used to perform a number of operations. The agent metadata can include a creation time and an agent ID for each for each of the streams 214 among other metadata provided by an agent (e.g., agent 119 illustrated in FIG. 1). The agent ID can provide information regarding the stream 214. For example, an agent ID can include an identification of a VM that is associated with the data 226 stored in the packfiles 226 and/or a path in which the data 266 associated with the VM is stored in a VM file system. The caller metadata can include a key/value pair for each of streams 214. The value can include data that ties a particular instance catalog to a specific VM and/or information about the particular instance catalog. The key can be data used to access the value. In the example provided in FIG. 2, the instance catalog 212 can be associated with a number of streams.

Separating the data layout 220 from the data content 222 can provide the ability to perform a number of operations directly on the metadata associated with the instance catalog 212 and/or the stream 214 to indirectly perform an operation on the data stored in the packfiles 216, the packfile indexes 218, and/or the data 226. Performing a number of operations directly on the metadata associated with the instance catalog 212 can include modifying the instance catalog 212. Modifying the instance catalog can include modifying the metadata stored in the instance catalog 212. Modifying the instance catalog can include deleting metadata from the instance catalog 212, editing metadata from the instance catalog 212, adding metadata to the instance catalog, creating a new instance catalog, and/or deleting the instance catalog 212.

In a number of examples, an operation can include a two parts. For example, an operation can include modifying the metadata in the instance catalog 212 to indirectly perform the operation on the data 226 and/or directly modifying the data 226, the packfiles 216, and/or the packfile indexes 216. Performing an operation the metadata stored in instance catalog 212 and/or stream 214 can provide the ability to perform a limited amount of operations with the data layout. A limited amount of operations is used to describe allowing a number of operations to be performed by an agent (e.g., agent 119 as illustrated in FIG. 1) and a separate number of operations to be performed by the storage system 200. Making the metadata available to an agent provides the agent with the ability to perform a number of operation on the metadata without giving an agent direct access to the packfiles 216. Making the metadata available to the agent may also relive the storage system 200 from performing a number of operations on the metadata stored in the instance catalog 212 and/or stream 214.

Figure 3:
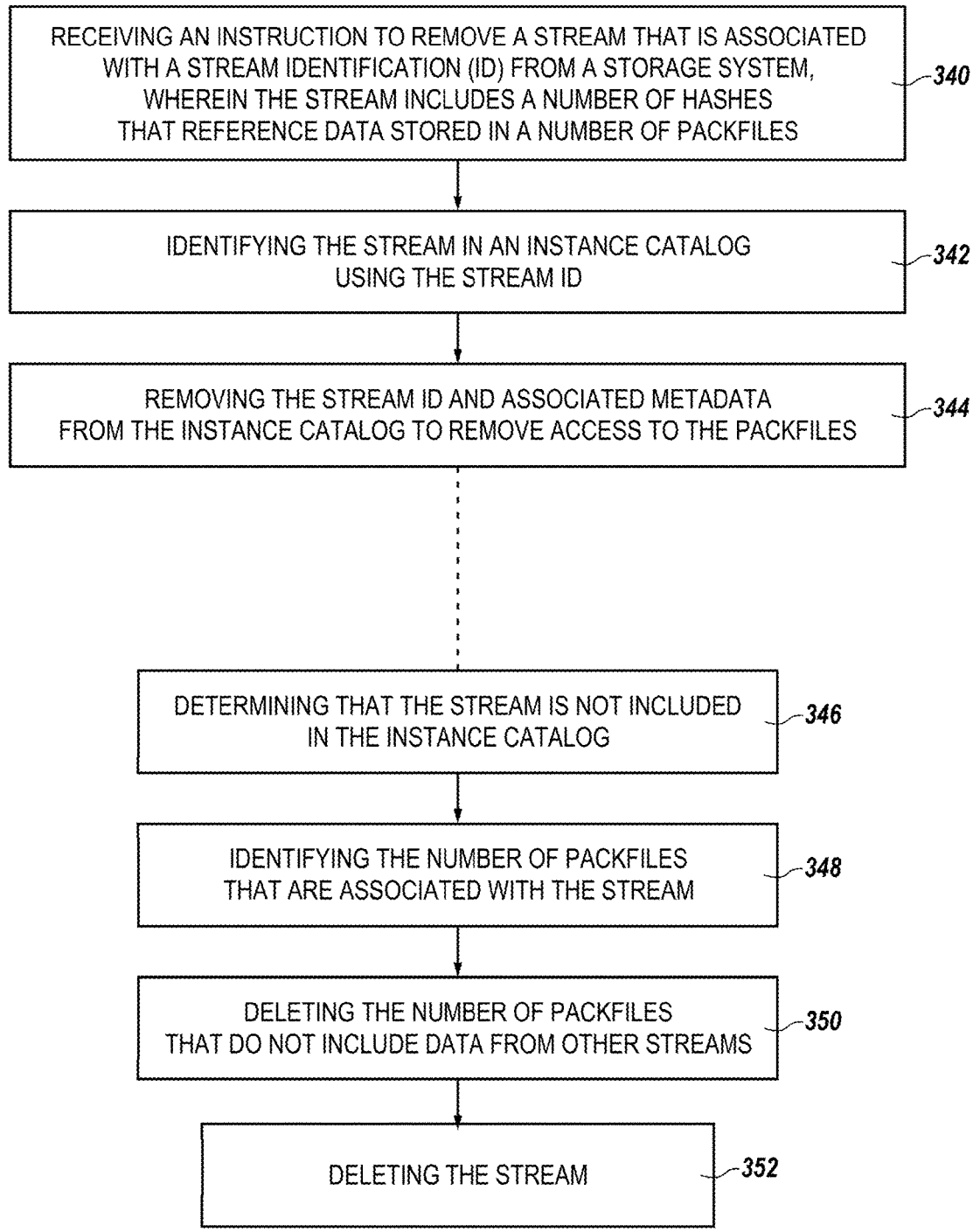
FIG. 3 is a flow chart illustrating a method for deleting data from a storage system according to a number of embodiments of the present disclosure.

FIG. 3 is a flow chart illustrating a method for deleting data from a storage system according to a number of embodiments of the present disclosure. The method illustrated in FIG. 3 includes a two part method for deleting data from a storage system. A first part can include 340, 342, and 344. The first part of the method for deleting data can include removing metadata from an instance catalog and/or stream. The first part of the method for deleting data can also include deleting a stream before packfiles are deleted. A second part can include 346, 348, 350, and 352. The second part of the method for deleting data can include deleting a number of packfiles and/or data stored in the packfiles. The method for deleting data can include performing the first part and/or the second part. In a number of examples, the first part and/or the second part of the method can be performed by an agent and/or by a storage system.

At 340, instructions can be received to remove a stream including a number of hashes from a storage system. At 340, a stream ID that is associated with the stream can also be received. The stream ID can be an agent ID and/or a system ID. At 342, a stream can be identified in an instance catalog using the stream ID. For example, the received stream ID can be compared to agent IDs to identify a single agent ID. The agent ID can be used to identify a corresponding system ID. The identified system ID can be used to identify a corresponding stream. At 344, the stream ID and the associated metadata can be removed from the instance catalog to remove access to the packfiles. Removing the stream ID can include removing an agent ID and/or a system ID of a stream. Removing metadata associated with the stream can include modifying the instance catalog. Removing the metadata and/or the stream ID from the instance catalog can include removing access to the stream without deleting the stream. For example, if an agent cannot access a system ID of a stream, then the agent will not be able to access the stream using the agent ID. In a number of examples, a stream can also be deleted from the storage system. In the first part of the method an operation engine does not perform the delete operation directly on the data and/or the packfiles.

The second part of the method can include deleting the data and/or packfiles from the storage system. The second part of the method can be performed by the storage system at a time after the first part of the method is performed. The second part of the method can be performed during a time in which there are no other requests being made from the storage system and/or during down time for the storage system. At 346, the stream can be determined not to be included in an instance catalog. Determining that the stream is not in the instance catalog can include determining whether a system ID associated with the stream is included in any of the instance catalogs. The system ID of a stream can be included in metadata stored in the stream. The system ID of a stream can be retrieved from the stream and can be compared to system IDs of other streams stored in a number of instance catalogs. If the system if of the stream is not identified in any of the instance catalogs, then the stream can be determined to not be included in an instance catalog.

At 348, a number of packfiles that are associated with the stream can be identified. The number of packfiles stored as metadata in the stream can be used to identify the packfiles. At 350, a number of packfiles that do not include data from other streams can be deleted. Deleting the number of packfiles can include determining whether there is data from other streams in a given packfile. For example, the hashes that were retrieved from the identified stream can be compared to the hashes stored in a packfile index that is associated with the given packfile. If the packfile index includes hashes that are not part of the identified stream then the hashes can be from other streams. It may be undesirable to delete a packfile that includes data from other streams that are not being deleted. If a packfile includes data that is associated with other streams, then the data that is associated with the identified stream may be deleted without deleting the packfile. At 352, a stream may be deleted from the storage system.

Figure 4:
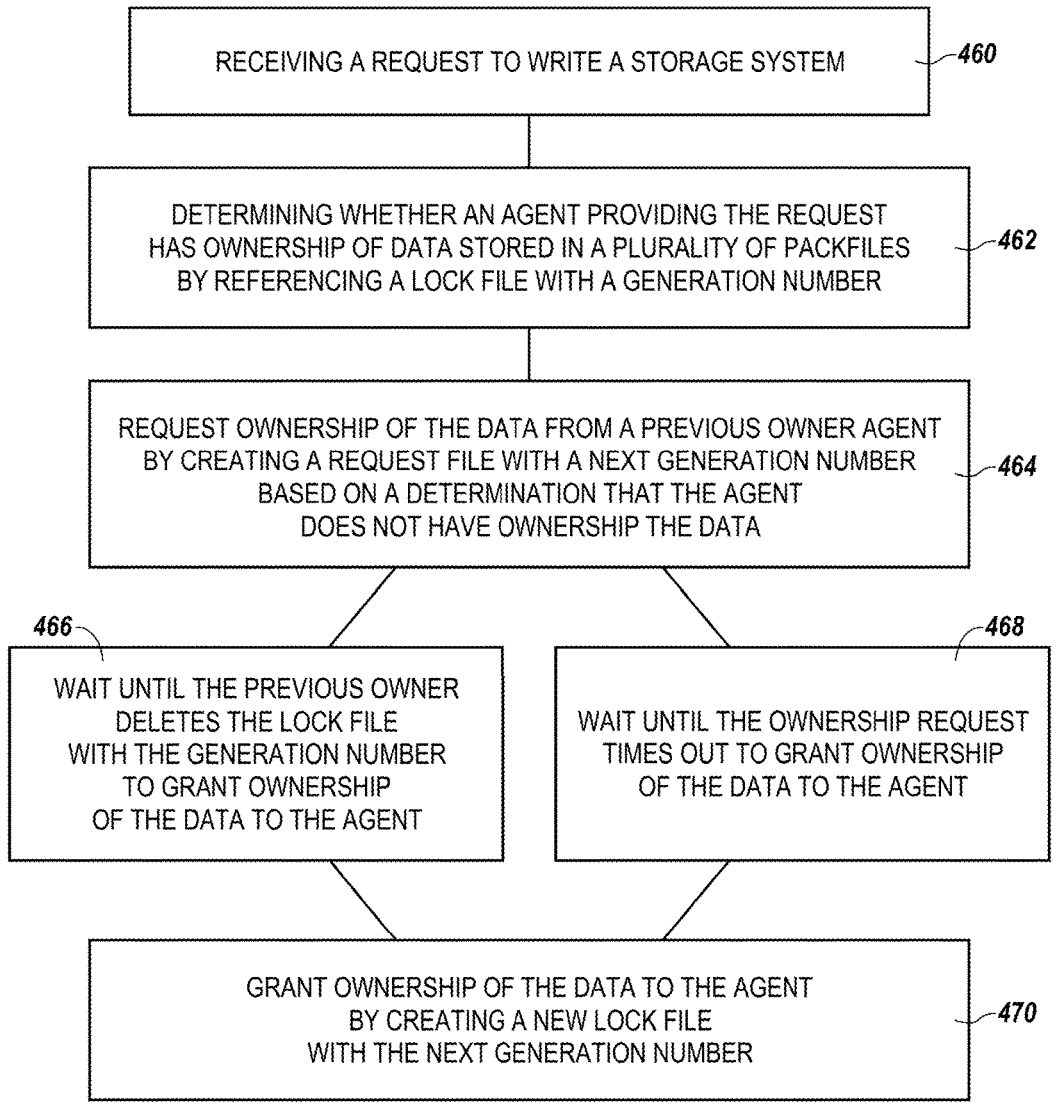
FIG. 4 is a flow chart illustrating a method for providing ownership of data according to a number of embodiments of the present disclosure.

FIG. 4 is a flow chart illustrating a method for providing ownership of data according to a number of embodiments of the present disclosure. A storage system as described herein may provide a number of privileges to owner agents and non-owner agents alike. For example, the storage system may provide owner agents and/or non-owner agents read access to data stored in the storage system. The storage system may also provide different privileges to owner agents and non-owner agents. For example, the storage system may provide editing privileges to owner agents and/or not to non-owner agents.

An owner agent can be an agent that is granted ownership of a group, a VID, an instance catalog, a stream, and/or data that is associated with the instance catalog and/or the stream. In the example provided in FIG. 1, ownership of a VID is granted. Ownership of a VID 104 provides ownership of the metadata 110, the instance catalogs 112, the streams 114, the packfiles 116, and/or the packfile indexes 118 in FIG. 1. That is, ownership of the VID 104 provides the ability to edit the metadata 110, the instance catalogs 112, the streams 114, the packfiles 116, and/or the packfile indexes 118 and/or write to the VID 104. In a number of examples, editing any of the instance catalogs 112, the streams 114, and/or the packfiles 116 can include creating a new version of the corresponding instance catalog.

At 460, a request to write to a storage system can be received. The request can include a stream ID (e.g., agent ID), a group ID, a VID, and/or an instance catalog ID. At 462, it can be determined whether an agent 119 providing the request has ownership of data stored in the packfiles by referencing a lock file 108 with a generation number. The lock file 108 in FIG. 1 identifies an owner of the group 102, VID 104, the metadata 110, the instance catalogs 112, the streams 114, and/or the packfiles 116. If the agent 119 is identified in the lock file 108, then agent 119 is granted privileges to modify and/or write to the metadata 110, the instance catalogs 112, the streams 114, and/or the packfiles 116 as described above.

At 464, ownership of the data can be requested from a previous owner agent by creating a request file with a next generation number based on a determination that the agent does not have ownership of the data. The request can be provided via the request file 106. The request file can have an associated generation number that can be used to correlate the request file 106 with the lock file 108. In a number of examples, the previous owner agent can monitor the request file 106 to determine whether a request file 106 with a new generation number has been created and/or if the request file with a previous generation number has been deleted to determine if the previous owner agent continues to have ownership of the lock file 108. If the previous owner agent determines that a new request file has been created, then the previous owner can relinquish ownership by deleting the lock file that identifies his as owner of the data.

At 466, the storage system 100 and/or the agent 119 can wait until the previous owner deletes the lock file with a generation number (e.g., previous generation number) to gran ownership of the data to the agent. At 468, the storage system 100 and/or the agent 119 can wait until the ownership request times out to gran ownership of the data to the agent 119. A request can time out if a predetermined amount of time transpires after the ownership request is made. At 470, ownership of the data can be granted to the agent by creating a new lock file with the next generation number. At 470, the old lock file with the previous generation number can be deleted if it has not been deleted by the previous owner agent.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising: a storage system including:
   one or more virtual identifications, each virtual identification associated with at least one virtual computing instance associated with of a virtual machine, wherein the virtual identification includes:
   a plurality of packfiles that store data that comprises the virtual computing instance;
   a plurality of streams, wherein each stream includes a plurality of hashes that reference data of the virtual computing instance stored in the plurality of packfiles and corresponding identifiers of packfiles storing data referenced by the respective hashes, wherein each hash is created using a hash function that maps data of an arbitrary size to a hash such that the hashes identify different portions of the data that comprises the virtual computing instance: and
   an instance catalog that includes an identification of each of the plurality of streams; and
   an operation engine to perform a number of operations on the plurality of packfiles by modifying the instance catalog using the identification of the plurality of streams.

2. The system of claim 1, wherein the operation engine performs the number of operations indirectly on the plurality of packfiles.

3. The system of claim 1, wherein the instance catalog includes agent metadata and caller metadata that is used to perform the number of operations.

4. The system of claim 3, wherein the agent metadata includes a creation time and a human readable name for each of the plurality of streams.

5. The system of claim 3, wherein the caller metadata includes a key/value pairs for each of the plurality of streams.

6. The system of claim 3, wherein the operation engine performs the number of operations directly on the identification of the plurality of streams, the agent metadata, and the caller metadata.

7. The system of claim 1, wherein the plurality of packfiles do not have an associated file system.

8. The system of claim 1, further comprising a push engine to: store data segmented into a number of chunks in the plurality of packfiles;
   store a plurality of hashes representing the number of chunks in a particular stream in the plurality of streams; and
   store a reference of the stream in the instance catalog.

9. The system of claim 1, further comprising a query engine to: receive a reference to a particular stream in the plurality of streams;
   identify the stream using the reference and the instance catalog; identify a portion of the plurality of packfiles that are associated with the stream; and retrieve the data stored in the portion of the plurality of packfiles that are associated with the stream.

10. A method, comprising:
   receiving an instruction to remove a stream that is associated with a stream identification (ID) from a storage system, wherein the stream includes a number of hashes that reference data stored in a number of packfiles, wherein the number of packfiles store data associated with a virtual computing instance associated with a virtual machine;
identifying the stream in an instance catalog using the stream ID, wherein the instance catalog includes an identification of a plurality of streams for the virtual computing instance including the stream ID; and
in response to determining that there are no pending requests to the storage system, removing the stream ID and associated metadata from the instance catalog to remove access to the packfiles referenced by the stream wherein removing the stream ID and associated metadata from the instance catalog does not include deleting the number of packfiles that are associated with the stream.

11. The method of claim 10, wherein removing the stream ID and associated metadata from the instance catalog includes removing access to the stream without deleting the stream.

12. The method of claim 10, comprising: determining that the stream is not included in the instance catalog; identifying the number of packfiles that are associated with the stream; and deleting the number of packfiles that do not include data from other streams.

13. The method of claim 10, comprising:
determining that the stream is not included in the instance catalog; and deleting the stream in response to the determination that the stream is not included in the instance catalog.

14. A non-transitory machine-readable medium storing instructions executable by a processing resource to cause a computing system to:
receive a request to write to a storage system, wherein the request to write to a storage system includes a request to modify an instance catalog associated with a particular virtual computing instance;
determine whether an agent providing the request has ownership of data stored in a plurality of packfiles that store data that comprises the virtual computing instance by referencing a lock file with a generation number, wherein the lock file is stored in a virtual identification associated with the virtual computing instance that further includes the plurality of packfiles and the instance catalog;
request ownership of the data from a previous owner agent by creating a request file with a next generation number based on a determination that the agent does not have ownership of the data; and
in response to determining that an ownership request made by the agent has timed out, grant ownership of the data to the agent by creating a new lock file with the next generation number.

15. The medium of claim 14, comprising instructions executable by the processing resource to delete the lock file with the generation number.

16. The medium of claim 14, comprising instructions executable by the processing resource to wait until the previous owner deletes the lock file with the generation number to grant ownership of the data to the agent.

17. The medium of claim 14, comprising instructions to time out the ownership request made by the agent when a predetermined amount of time transpires after the ownership request is made.

* * * * *